Feb. 21, 1928.

W. F. PITTMAN

FERTILIZER DISTRIBUTOR

Filed Feb. 10, 1927

1,660,047

Inventor
W. F. Pittman.

By
Randolph Jr.
Attorney

Patented Feb. 21, 1928.

1,660,047

UNITED STATES PATENT OFFICE.

WALTER F. PITTMAN, OF KENLY, NORTH CAROLINA.

FERTILIZER DISTRIBUTOR.

Application filed February 10, 1927. Serial No. 167,327.

This invention relates to improvements in the fertilizer distributor forming the subject-matter of my U. S. Letters Patent No. 1,560,313, granted November 4, 1925, and has for one of its objects to improve this machine to the end that it will, during each time that it is drawn over a field, distribute the fertilizer over a comparatively wide area without the aid of a spreader.

A further object of the invention is to provide a machine of this character wherein the rollers shall be adapted to effect the stated distribution of the fertilizer and crush and break up any lumped particles thereof and which shall embody novel means for rotatably supporting the rollers from the hopper and for keeping the rollers free of fertilizer.

A further object of the invention is to provide a machine of this character wherein one of the rollers shall be adjustable with respect to the other so as to vary the feed of the fertilizer and which shall embody novel means for adjusting the roller and securing it in adjusted position.

Figure 1:
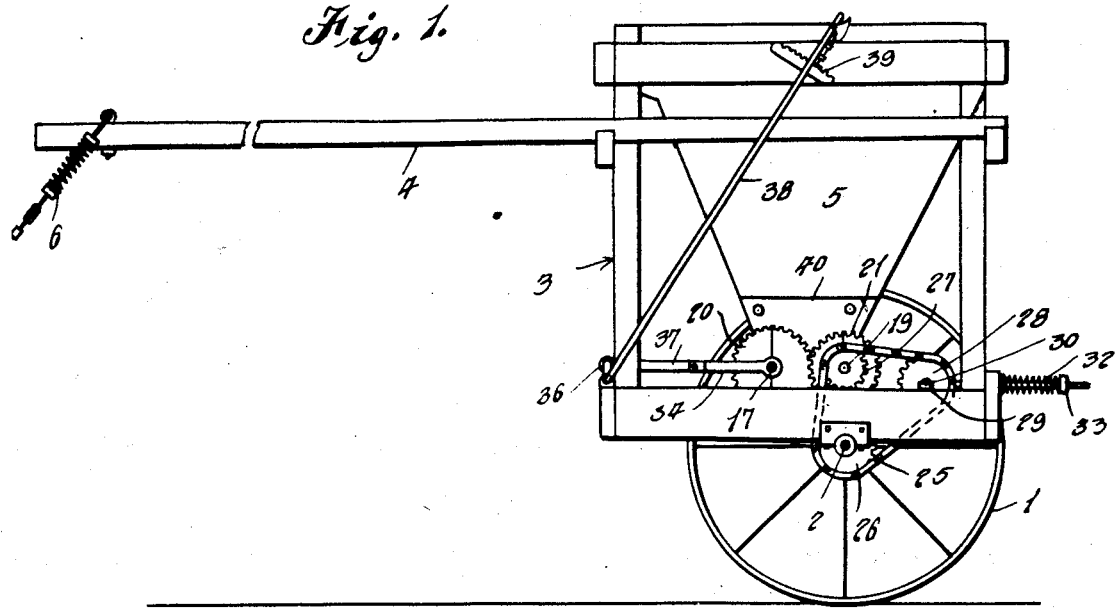
Figure 2:
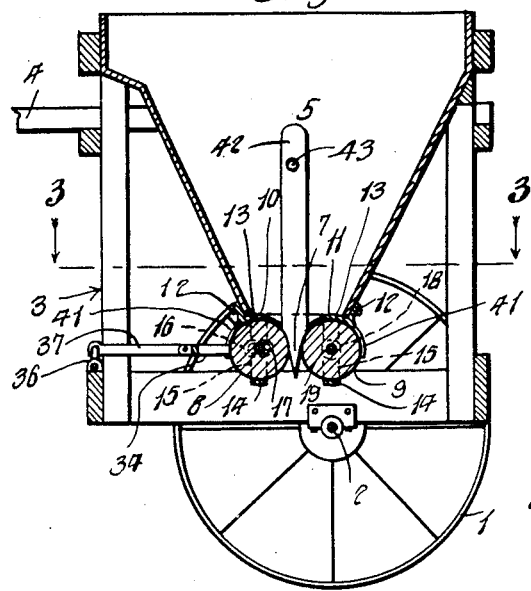
Figure 3:
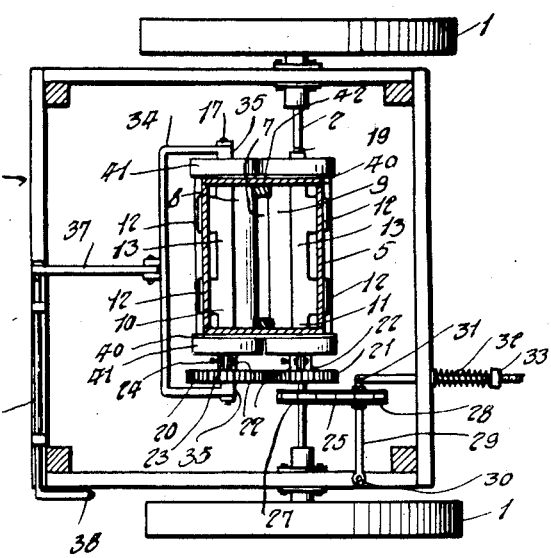
Figure 4:
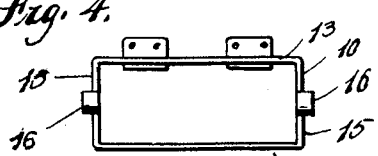
Figure 5:
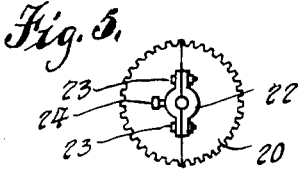
Figure 6:
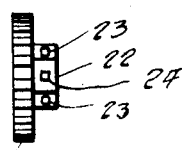

The foregoing and other objects are attained by the construction, combination and arrangement of parts hereinafter fully described and claimed, and illustrated in the accompanying drawing, wherein:

Figure 1 is a view in side elevation of a fertilizer distributor embodying the present invention, Figure 2 is a sectional view taken on a vertical plane extending centrally and longitudinally through the machine, Figure 3 is a sectional view taken on the horizontal plane indicated by the line 3—3 of Figure 2, Figure 4 is a detail elevational view of one of the rollers and its supporting frame, Figure 5 is a detail elevational view of one of the sprocket wheels of the machine, and Figure 6 is a side view of the sprocket wheel.

Referring in detail to the drawing in the several views of which like reference characters denote like parts, 1 designates the wheels, 2 the axle, 3 the frame, 4 the tongues, and 5 the hopper of the machine. One of the wheels 1 is fixed to the axle 2, and the other is connected to the axle in a manner to permit these parts to rotate freely with respect to each other. The tongues 4 are provided with spring tugs 6 which are adapted to be attached to the hames of the draft animal and which obviate the necessity of the use of traces and a single-tree. The hopper 5 is provided in the bottom thereof with a discharge opening 7 of a length equal to the width thereof.

A pair of rollers 8 and 9 is rotatably supported from the hopper 5 and are positioned at opposite sides of the longitudinal center of the feed opening 7. The rollers 8 and 9 are as long as the feed opening 7 and the upper portions thereof project into the hopper 5. The rollers 8 and 9 are reversely driven so that their adjacent surfaces travel downwardly and carry the fertilizer between them with the result that the positive feed is assured and any lumps are crushed and broken up. Frames 10 and 11 are secured to the hopper 5 as shown at 12, and each consists of a top member 13, bottom member 14 and end members 15. The rollers 8 and 9 are rotatably supported within the frames 10 and 11, respectively, and the frame members 13 and 14 are of arcuate formation in cross section and contact with the rollers. The top frame members 13 extends into the hopper 5 above the rollers 8 and 9 and serve to direct the fertilizer between the rollers, and the frame members 14 function as scrapers to keep the rollers free of fertilizer. The frame 10 is provided with slightly elongated bearings 16 for the reception of the shaft 17 of the roller 8, and the frame 11 is provided with circular bearings 18 for the reception of the shaft 19 of the roller 9. The rollers 8 and 9 are secured to their shafts and are connected so as to be reversely driven by gear wheels 20 and 21, the gear wheel 20 being fixed to the shaft 17 and the gear wheel 21 to the shaft 19. The gear wheels 20 and 21 are of sectional formation and are provided with hubs 22 which project beyond the inner sides thereof. The gear wheels sections are secured together by bolts 23, and the gear wheels are secured to their shafts by set screws 24. The rollers 8 and 9 are driven from the axle 2 by a sprocket chain 25 which passes about a sprocket wheel 26 fixed to the axle and about a sprocket wheel 27 fixed to the roller shaft 19. The sprocket chain 25 also passes about a tensioning sprocket wheel 28 which is journaled on the shaft 29 pivoted as at 30 to the frame 3. The shaft 29 is provided at its free end with a pivoted extension 31 which passes through the frame 3 and upon which is mounted a tensioning spring 32. The spring 32 bears against the frame 3 and a nut 33 engaged with the shaft extension 31 and through the medium of which the tension of the spring may be varied.

Due to the manner in which it is mounted in its frame 10, the roller 8 may be adjusted with respect to the roller 9. The means for adjusting this roller comprises a yoke 34 which is provided at its ends with bearings 35 for the reception of the shaft 17 of the roller, a shaft 36 journaled on the frame 3 and connected to the yoke by a link 37, and a lever 38 fixed to the shaft. The lever 38 extends upwardly from the shaft 36 and is engaged adjacent its upper end with a notched sector 39 which holds it against casual movement. By moving the lever 38 out of engagement with the notched sector 39 the roller 8 may be readily adjusted, and by engaging the lever with the notched sector the roller will be secured in adjusted position.

Plates 40 are secured to the sides of the hopper 5 adjacent the bottom of the latter, and are provided with substantially semi-cylindrical housings 41 for the ends of the rollers 8 and 9. The plates 40 and housings 41 prevent the fertilizer from working out through the sides of the hopper 5 immediately adjacent the rollers 8 and 9. If desired, members 42 having wedge shaped lower ends may be secured within the hopper 5 with said ends positioned between the rollers 8 and 9 for the purpose of reducing the effective width of the feed opening 7 with the consequent reduction of the feed of the fertilizer. The members 42 are removably secured in vertical position against the inner surfaces of the lateral sides of the hopper 5 by means of pins 43. The feed of the fertilizer may also be varied by replacing the gear wheels 20 and 21 by wheels of different diameter.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A fertilizer distributor comprising a hopper having a discharge opening equal in length to the width thereof, feed rollers journaled on the hopper at opposite sides of the longitudinal center of the discharge opening and equal in length to the corresponding dimension of said opening, means for reversely rotating the feed rollers, and frames in which the feed rollers are journaled, said frames including arcuate top members extending into the hopper above the feed rollers and arcuate bottom members functioning as scrapers for the feed rollers.

2. A fertilizer distributor comprising a hopper having a discharge opening equal in length to the width thereof, feed rollers journaled on the frame at opposite sides of the discharge opening and equal in length to the corresponding dimension of said opening, means for supporting the feed rollers one for movement about a fixed axis and the other for movement about an adjustable axis, a yoke connected to the adjustable axis, a shaft, a link connecting the shaft to the yoke, a lever secured to the shaft, means for holding the lever against casual movement, and means for rotating the feed rollers in opposite directions.

3. A fertilizer distributor comprising a hopper having a discharge opening equal in length to the width thereof, feed rollers journaled on the hopper at opposite sides of the longitudinal center of the discharge opening and equal in length to the corresponding dimension of said opening, means for rotating the feed rollers, and members removably secured in vertical position against the inner surfaces of the lateral sides of the hopper and having wedge shaped lower ends positioned between the feed rollers for the purpose of reducing the effective length of the discharge opening.

In testimony whereof I affix my signature.

WALTER F. PITTMAN.